(12) United States Patent
De Lemos Junior et al.

(10) Patent No.: US 11,549,314 B2
(45) Date of Patent: Jan. 10, 2023

(54) SUBSEA RISER SYSTEMS

(71) Applicant: Subsea 7 do Brasil Services Ltda, Niteroi—Rio de Janeiro (BR)

(72) Inventors: Luiz Carlos De Lemos Junior, Rio de Janeiro (BR); Gustavo Queiroz Hepner, Rio de Janeiro (BR); Andre Ramiro Amorim, Rio de Janeiro (BR); Joao Carlos Carvalho Gouveia, Rio de Janeiro (BR); Frederico Nicoletti de Fraga, Niteroi (BR); Ivan Carlos Pimentel da Cruz, Niteroi (BR); Daniel Karunakaran, Tananger (NO)

(73) Assignee: Subsea 7 do Brasil Servicos Ltda, Niteroi—Rio de Janeiro (BR)

( * ) Notice: Subject to any disclaimer, the term of this patent is extended or adjusted under 35 U.S.C. 154(b) by 0 days.

(21) Appl. No.: 16/647,068

(22) PCT Filed: Sep. 14, 2018

(86) PCT No.: PCT/BR2018/050339
§ 371 (c)(1),
(2) Date: Mar. 13, 2020

(87) PCT Pub. No.: WO2019/051576
PCT Pub. Date: Mar. 21, 2019

(65) Prior Publication Data
US 2020/0224503 A1    Jul. 16, 2020

(30) Foreign Application Priority Data

Sep. 14, 2017    (GB) ..................................... 1714808

(51) Int. Cl.
*E21B 17/01*    (2006.01)
*B63B 35/03*    (2006.01)
(Continued)

(52) U.S. Cl.
CPC ............ *E21B 17/015* (2013.01); *B63B 35/03* (2013.01); *E21B 17/017* (2013.01); *E21B 19/004* (2013.01); *E21B 19/22* (2013.01); *F16L 1/203* (2013.01)

(58) Field of Classification Search
CPC ...... E21B 17/017; E21B 17/015; F16L 1/123; F16L 11/18
See application file for complete search history.

(56) References Cited

U.S. PATENT DOCUMENTS 3,475,039 A    10/1969    Ortloff
4,031,919 A    6/1977    Ortloff et al.
(Continued)

FOREIGN PATENT DOCUMENTS

BR    PI 0602675-3    2/2008
EP    1 213 522    6/2002
(Continued)

OTHER PUBLICATIONS

ANSI/API Specification 17J, "Specification for Unbonded Flexible Pipe," 3d ed. 2008.
(Continued)

*Primary Examiner* — Sean D Andrish
(74) *Attorney, Agent, or Firm* — Levy & Grandinetti

(57) ABSTRACT

A pliant link to mitigate fatigue-inducing motion of a subsea catenary riser has an articulated spine having a longitudinal series of interconnected rigid segments. The spine can be coupled to upper and lower sections of the riser to transmit loads along the riser through the link on a load path that extends through the segments. The link also has a pliant pipe terminating in end fittings that can be joined, respectively, to the upper and lower sections of the riser for fluid communication along the riser through the link.

26 Claims, 8 Drawing Sheets

(51) Int. Cl.
*E21B 19/00* (2006.01)
*E21B 19/22* (2006.01)
*F16L 1/20* (2006.01)

(56) References Cited

U.S. PATENT DOCUMENTS

| | | | |
|---|---|---|---|
| 4,647,255 A | 3/1987 | Pow | |
| 5,865,378 A * | 2/1999 | Hollinshead | F16L 11/18 239/587.1 |
| 6,030,145 A * | 2/2000 | Stewart, Jr | E21B 17/015 405/171 |
| 6,220,303 B1 * | 4/2001 | Secher | E21B 43/0135 138/110 |
| 2001/0018007 A1 * | 8/2001 | Puttmann | E21B 7/30 405/184.3 |
| 2003/0044235 A1 | 3/2003 | Stockstill | |
| 2005/0196243 A1 * | 9/2005 | Pollock | E21B 17/085 405/224.3 |
| 2012/0241037 A1 * | 9/2012 | Lund | |
| 2013/0315673 A1 | 11/2013 | Pionetti et al. | |
| 2016/0076684 A1 | 3/2016 | Coutts et al. | |
| 2016/0186893 A1 | 6/2016 | Nakovski | |

FOREIGN PATENT DOCUMENTS

| | | |
|---|---|---|
| GB | 2 452 961 | 3/2009 |
| JP | 60-188275 | 9/1985 |
| WO | WO 2007/125276 | 11/2007 |
| WO | WO 2011/117567 | 9/2011 |
| WO | WO 2012/168702 | * 12/2012 |
| WO | WO 2015/193607 | * 12/2015 |

OTHER PUBLICATIONS

API Specification 5L, "Specification for Line Pipe," 45th ed. 2012.
API Recommended Practice 17B, "Recommended Practice for Flexible Pipe," 5th ed. 2014.
API Recommended Practice 1111, "Design, Construction, Operation, and Maintenance of Offshore Hydrocarbon Pipelines (Limit State Design)," 5th ed. 2015.

* cited by examiner

SUBSEA RISER SYSTEMS

BACKGROUND OF THE INVENTION

This invention relates to riser systems as used in the subsea oil and gas industry to convey hydrocarbon fluids from the seabed to the surface.

Various riser configurations using rigid or flexible pipelines are known, including those known in the art as freehanging, steep, lazy-wave and weight-distributed risers.

A common free-hanging riser comprises a rigid pipe that hangs freely as a catenary from an upper support such as a platform or an FPSO (floating production, storage and offloading) vessel. Most conventionally, such a riser is of steel, hence being known in the art as a steel catenary riser or SCR.

Those skilled in the art know that nominally rigid pipes are not devoid of flexibility. Indeed, SCRs exploit the bending behaviour of rigid pipes in the elastic domain. However, whilst they have flexibility, 'rigid' pipes do not fall within the definition of 'flexible' pipes as understood in the art.

Conventional rigid pipes used in the subsea oil and gas industry are specified in API (American Petroleum Institute) Specification 5L and Recommended Practice 1111. A rigid pipe usually consists of or comprises at least one pipe of solid steel or steel alloy. However, additional layers of other materials can be added, such as an internal liner layer or an outer coating layer. Such additional layers can comprise polymer, metal or composite material. A rigid pipe may also have a concentric pipe-in-pipe (PiP) structure. Rigid pipe joints are terminated by a bevel or a thread, and are assembled end-to-end by welding or screwing them together to form a pipe string or pipeline.

The allowable in-service deflection of rigid pipe is determined by the elastic limit of steel, which is around 1% bending strain. Exceeding this limit caused plastic deformation of the steel. It follows that the minimum bend radius or MBR of rigid pipe used in the subsea oil and gas industry is typically around 100 to 300 metres. However, slight plastic deformation can be recovered or rectified by mechanical means, such as straightening. Thus, during reel-lay installation of a rigid pipeline made up of welded rigid pipes, the rigid pipeline can be spooled on a reel with a typical radius of between 8 and 10 metres. This implies a bending strain above 2% for conventional diameters of rigid pipes, requiring the pipe to be straightened mechanically during unreeling.

Flexible pipes used in the subsea oil and gas industry are specified in API Specification 17J and API Recommended Practice 17B. The pipe body is composed of a composite structure of layered materials, in which each layer has its own function. Flexible pipes are terminated by end fittings, which are usually of steel.

Bonded flexible pipes comprise bonded-together layers of steel, fabric and elastomer and are manufactured in short lengths in the order of tens of metres. Conversely, unbonded flexible pipes can be manufactured for use in dynamic environments in lengths of hundreds of metres. Typically, polymer tubes and wraps ensure fluid-tightness and thermal insulation. Conversely, steel layers or elements provide mechanical strength; for example, interlocked steel tapes form a carcass or pressure vault and a tensile armour is formed of helically-wound wire.

The structure of a flexible pipe allows a large bending deflection without a significant increase in bending stresses. The bending limit of the composite structure is determined by the elastic limit of the outermost plastics layer of the structure, typically the outer sheath, which limit is typically 6% to 7% bending strain. Exceeding that limit causes irreversible damage to the structure. Consequently, the MBR of flexible pipe used in the subsea oil and gas industry is typically between 3 and 6 metres.

The industry has also begun to adopt rigid pipes of composite materials in place of steel, particularly pipes of polymer resin reinforced by fibres such as glass fibres or carbon fibres. The polymer matrix may be of thermoplastic or thermoset materials, the former being known in the art as thermo-composite pipes.

Composite pipes have a load-bearing structure that is principally of composite materials. This is to be distinguished from pipes having composite structures, such as the various layered configurations of rigid and flexible pipes mentioned above.

Composite pipes are not yet specified in standards tailored to the subsea oil and gas industry. However, they have clearly-understood characteristics that distinguish them from both flexible pipes and conventional rigid pipes of steel. For example, composite pipes cannot flex in the manner of flexible pipes, without a commensurate increase in bending stress. However, composite pipes are typically terminated by steel end fittings like flexible pipes. Conversely, composite pipes can withstand substantially more bending strain within the elastic domain than rigid steel pipes. However, unlike rigid steel pipes, composite pipes cannot be bent beyond their elastic limit without suffering irreversible damage.

Despite these differences, composite pipes have broadly similar elastic bending behaviour to steel pipes in the context of the present invention, that is, when bent along their length as a catenary. Consequently, for brevity, references to rigid pipes or pipelines in this specification are intended to encompass both steel pipes and composite pipes unless the context requires otherwise. Indeed, some rigid PiP systems may employ both steel and composite pipes in concentric relation.

A free-hanging rigid riser has advantages of low cost and ease of installation. For example, such risers may be installed by conventional pipelaying vessels using well-proven installation techniques such as S-lay, J-lay or reel-lay. However, a simple riser solution like this is not technically viable for some more challenging projects, especially in dynamic environments that will often suffer from high sea states and strong currents. This creates a problem because more complex riser systems that meet all technical challenges are much more expensive, especially if they cannot be installed using techniques for which appropriate installation vessels are widely available.

A riser suspended between a floating vessel and the seabed moves in multiple directions on various timescales and frequencies throughout its operational life. Motion of the riser is driven by various inputs, notably: motion of the supporting vessel expressed as heave, pitch, roll and yaw; seawater motion caused by currents, tides and waves, including flows that promote vortex-induced vibration (VIV); and pipeline motion across the seabed, known in the art as walking. Repetitive or oscillatory motion generates fatigue in a riser that may, over time, cause its failure and rupture.

A free-hanging rigid riser such as an SCR is particularly susceptible to fatigue-inducing motion being transmitted from a supporting vessel toward the touch-down point, where the riser meets the seabed beyond a sagbend.

Vessel motion is the prime driver of fatigue-inducing motion in a riser that is freely suspended from a vessel. For example, wave-driven movement of an FPSO may cause dynamic compression-wave pulses to travel downwardly along an attached free-hanging riser, rather like a wave travelling along a whip. Such pulses travel from the top joint connection where the riser is connected to the FPSO toward the touch-down point.

In order to reduce fatigue, it is known to decouple at least a portion of a riser from the motion of a supporting vessel. For example, decoupling the riser and the vessel may be achieved by allowing degrees of freedom at the connection between the riser and the vessel. This approach is used in hybrid risers that effect a flexible connection to the vessel through a flexible pipeline or jumper pipe.

Using a fully-flexible riser made of unbonded flexible pipeline is another known solution. However, unbonded flexible pipeline is very expensive, has limited resistance to pressure and temperature and is of limited diameter and hence flow capacity.

U.S. Pat. No. 4,031,919 discloses a fully-articulated riser system made of successive rigid ramps articulated two-by-two by universal joints. Flexible bends are inserted at each joint. This is a complicated system that is unsuitable for a catenary riser because the bottom of the riser has to be connected to a dedicated structure. Also, the riser system cannot be installed by a standard pipelaying vessel.

US 2016/076684 shows another type of combination of a flexible pipeline and articulated joint.

Top pliant connections are very expensive and difficult to install. It is cheaper and easier to connect the riser directly and rigidly to the FPSO. In that case, a facility to withstand differential motion has to be provided at another location on the riser.

As an example of this latter approach, GB 2452961 discloses an L-shaped riser, in which an upper section suspended from an FPSO is articulated to a lower section by a swivel. This decouples the motion of the riser at the touch-down point from the motion of the vessel. As the upper section of the riser is vertical, the angle adopted by the swivel joint remains near 90°. The swivel joint is a special forged piece that cannot accommodate significantly greater angular variation. Additionally, the design of the riser system introduces difficulties in installation and connection and may be susceptible to leaks.

BR PI 0602675 teaches decoupling the motions of upper and lower portions of a catenary riser by inserting a flexible link between the portions at an intermediate location along the riser. The link makes separate fluid and mechanical connections between the portions of the riser. Specifically, the portions are fluidly connected by a flexible jumper pipe and are mechanically connected by a deformable link such as a cable that can withstand tension in the riser. A drawback of this arrangement is that the flexible pipe has too much freedom of movement and could therefore be bent excessively and damaged, during installation or use, because the mechanical link is too pliant.

US 2016/186893 discloses bend-limiting vertebrae for a flexible pipe. U.S. Pat. No. 4,647,255 discloses two-axis articulation using washers in close contact with each other. However, in the context of the present invention, designs like these would be too sensitive to wear caused by repeated cyclical relative motion between the successive elements.

More generally, vertebrae bend restrictors are known to be used in essentially static situations where a flexible line is attached to another, static structure. The vertebrae typically comprise a short tubular series of annular polymer blocks that are placed around a line at a location where the line is vulnerable to over-bending. Whilst the line is held static at that location, other portions of the line may move during installation, maintenance and operation. Hence, bending stresses will increase around a location where the line is fixed.

For example, a bend restrictor may be used at an end of an umbilical line where that line is connected to a 'Christmas tree' structure atop a subsea wellhead. The bend restrictor helps to protect the end portion of the line from being overstressed and bent beyond its MBR if the remainder of the line moves. It is also possible to use a bend restrictor at an intermediate location along a line, for example if mooring forces are applied to the line at that location.

U.S. Pat. No. 3,475,039 describes a ball joint assembly for connecting two pipes. The assembly includes a collar member that limits relative angular movement of the pipes.

US 2013/315673 relates to a device for limiting curvature of a flexible pipe around which it is installed. The device is formed by a plurality of tubular sleeve elements that are fastened end-to-end and are able to pivot with respect to one another.

WO 2011/117567 describes a support apparatus formed of multiple tubular elements that surround and engage a riser received through an internal bore, and that permit a degree of pivoting motion in use.

The inventors have considered whether using a combination of a flexible pipe and a vertebrae bend restrictor could solve the problem of fatigue caused by compressive waves travelling down a catenary riser. However, they have concluded that this would not be an effective solution. For example, a vertebrae bend restrictor plays no part in bearing axial loads carried by the flexible pipe that it protects against over-bending. Consequently, the armour layer of the flexible pipe has to be strong enough to bear the tension in the riser, which unhelpfully increases the cost, weight and MBR of the flexible pipe. Also, if used for the purpose of the invention, a bend restrictor could lock and increase the moment on the vertebrae, which could therefore fail.

BRIEF SUMMARY OF THE INVENTION

Against this background, the invention provides a pliant link for a subsea riser. The link comprises an articulated spine having a longitudinal series of interconnected rigid segments that can be coupled to upper and lower sections of the riser to transmit loads along the riser through the link on a load path that extends through the segments. The link further comprises a pliant pipe terminating in end fittings that can be joined, respectively, to the upper and lower sections of the riser for fluid communication along the riser through the link.

Advantageously, the pliant pipe is substantially decoupled from the load path.

The segments preferably surround and protect the pliant pipe.

The end fittings are suitably engaged rigidly with respective ends of the spine, such that the load path extends at least partially through the end fittings. In that case, interface formations of the end fittings may be adapted for mechanical and fluid coupling with the upper and lower sections of the riser. For example, the interface formations may comprise bevelled ends. Anchor formations of the end fittings may engage within sleeves at the ends of the spine.

The spine is preferably arranged to transmit compressive, tensile and torsional loads along the riser through the link.

Segments of the spine are suitably connected to adjoining segments of the spine for relative pivotal movement between those segments.

Each segment of the spine may comprise first and second parts that are connected to each other for relative pivotal movement. For example, the first part of an intermediate segment may be pivotably coupled to the second part of an adjoining segment and the second part of the intermediate segment may be pivotably coupled to the first part of another adjoining segment.

The first part of a segment may be a ring and the second part of the segment may be a pull head, the pull head comprising a body and first projections extending longitudinally from the body to support the ring. The ring may then be coupled to the pull head of an adjoining segment. The pull head may further comprise second projections extending from the body in a longitudinal direction opposed to the first projections for coupling the pull head to the ring of an adjoining segment. The second projections may be offset angularly from the first projections about a longitudinal axis extending through the body.

Advantageously, relative pivotal movement between adjoining segments is possible about two mutually orthogonal axes. However, relative pivotal movement between adjoining segments is preferably limited to prevent the spine bending beyond a minimum bend radius of the pliant pipe.

The spine may be substantially fixed in length. The pliant pipe is preferably no longer than the spine but the end fittings may extend beyond the length of the spine.

The pliant pipe is a discrete free-standing element that is structurally distinct from and insertable into the spine. The pliant pipe may therefore be free for movement relative to the segments of the spine. The segments of the spine may also be structurally distinct from each other.

The inventive concept embraces a subsea riser comprising the link of the invention, the link being situated between upper and lower sections of the riser. Preferably, the upper and lower sections are of rigid pipe and the link is situated between the surface and the seabed, most preferably at a sag bend of the riser. Advantageously, the pliant pipe has lower bending stiffness than the upper and lower sections of the riser.

The inventive concept also embraces a subsea installation comprising the riser of the invention. Preferably, the riser hangs as a catenary from a buoyant support at an upper end of the riser. More preferably, the support floats at the surface and may therefore be exemplified by an FPSO or a platform.

The inventive concept enables and extends to methods of installing a subsea riser. One such method comprises incorporating an articulated pliant link in-line while manufacturing the riser from a succession of pipe joints on an installation vessel offshore, the link transmitting mechanical loads between, and effecting fluid communication between, pipe joints to which the link is joined.

The method may comprise: manufacturing and partially overboarding a lower section of the riser; joining the link to a trailing end of the lower section; joining the link to a leading end of an upper section of the riser; and manufacturing and overboarding the remainder of the riser, including the link and the upper section. Such a method may for example be performed in an S-lay or J-lay operation, which may involve bending the link around a stinger supported by the installation vessel.

Another method of installing a subsea riser in accordance with the invention comprises: incorporating an articulated in-line pliant link between pipeline sections, which link transmits mechanical loads between, and effects fluid communication between, the pipeline sections to which the link is joined; and spooling the riser including the link onto a reel, while bending the link around the reel.

That method may comprise: manufacturing onshore a first pipeline section of the riser; spooling the first pipeline section onto a reel; manufacturing onshore a second pipeline section of the riser; joining the link to a trailing end of the first pipeline section and a leading end of the second pipeline section; and spooling the remainder of the riser comprising the link and the second pipeline section onto the reel.

The riser may then be installed by a reel-lay method performed on an installation vessel offshore, in which the link is unspooled from the reel with the pipeline sections.

Another method of installing a subsea riser in accordance with the invention comprises: joining an articulated in-line pliant link to at least one pipeline section on an installation vessel offshore; and installing the riser by a reel-lay method in which at least one pipeline section joined to the link is unspooled from a reel.

The link may be joined to a spooled pipeline section onshore and be joined to at least one other pipeline section on the installation vessel offshore to transmit mechanical loads, and to effect fluid communication, between those pipeline sections. Alternatively, the link may be joined to two pipeline sections on the installation vessel offshore to transmit mechanical loads, and to effect fluid communication, between those pipeline sections.

The method may comprise: manufacturing onshore a first pipeline section of the riser; spooling the first pipeline section onto a reel; manufacturing onshore a second pipeline section of the riser; and spooling the second pipeline section onto a reel. The first and second pipeline sections may be spooled onto the same reel or onto different reels.

Also, the method may comprise: joining an end of the link to a leading end of the second pipeline section, before, after or while partially installing the first pipeline section; joining another end of the link to a trailing end of the first pipeline section; and installing the remainder of the riser comprising the link and the second pipeline section.

In summary, embodiments of the invention provide a catenary riser in which upper and lower sections are connected by an articulated section that allows limited relative motion of the upper and lower sections in any direction.

The articulated section may comprise a plurality of interlocking rigid gimbal joints that connect the upper and lower sections mechanically and a flexible or pliant pipe that connects the upper and lower sections fluidly. The gimbal joints may be universal (Cardan) joints, ball joints, articulated vertebrae or a combination of the foregoing elements.

The pliant pipe suitably has substantially the same length as the articulated section and is conveniently situated inside the gimbal joints. The length of the articulated section is preferably constant.

The pliant pipe may, for example, comprise unbonded flexible pipeline, bonded flexible pipeline, polymer tubing or composite pipeline.

Elegantly, the gimbal joints may limit angular deflection of the pliant pipe, and hence its bend radius, to remain above its MBR. For example, relative angular movement of two successive gimbal joints is preferably less than 10° in transverse directions. However, save for accidental contact, the pliant pipe can suitably move freely in transverse directions inside the gimbal joints.

The inventive concept may be expressed in various preferred methods. In one such example, a method to install a catenary riser from a S-lay or J-lay installation vessel comprises the following steps: manufacturing and partially overboarding a first section of the catenary riser; connecting an articulated section to the upper end of the first section; connecting an end of a second section of the catenary riser to the articulated section; and manufacturing and overboarding the remaining of the catenary riser comprising the articulated section and the second section.

In another example, the invention resides in a method to install a catenary riser from a reel-lay installation vessel, the method comprising the following steps: manufacturing onshore a first section of the catenary riser; spooling said first section on a reel; manufacturing onshore a second section of the catenary riser; connecting an articulated section between the end of the first section and the nearest end of the second section; spooling the remaining of the catenary riser comprising the articulated section and the second section; and installing the catenary riser offshore by a reel-lay method.

In yet another example, the invention resides in a method to install a catenary riser from a reel-lay installation vessel, the method comprising the following steps:
a. manufacturing onshore a first section of the catenary riser, spooling said first section on a reel;
b. manufacturing onshore a second section of the catenary riser, spooling said second section on the same reel or another reel;
c. connecting onshore or offshore the first end of the articulated section to the end of the first section;
d. partially installing the second section of the catenary riser offshore by a reel-lay method;
e. connecting offshore the second end of the articulated section to the upper end of the second section of the catenary riser; and
f. installing the remaining of the catenary riser comprising the articulated section and the first section offshore by a reel-lay method.

Step d. above may be performed before, after or at the same time as step c. above.

BRIEF DESCRIPTION OF THE DRAWINGS

In order that the invention may be more readily understood, reference will now be made, by way of example, to the accompanying drawings in which.

DETAILED DESCRIPTION OF THE INVENTION

Figure 1:
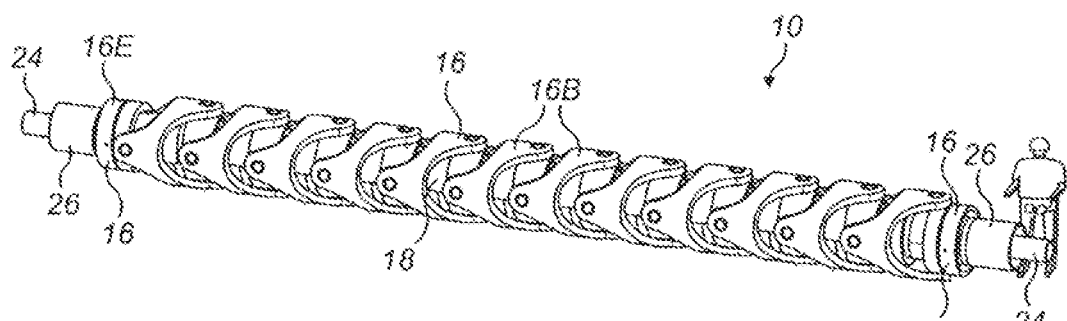
FIG. 1 is a perspective view of an articulated link in accordance with the invention.
Figure 2:
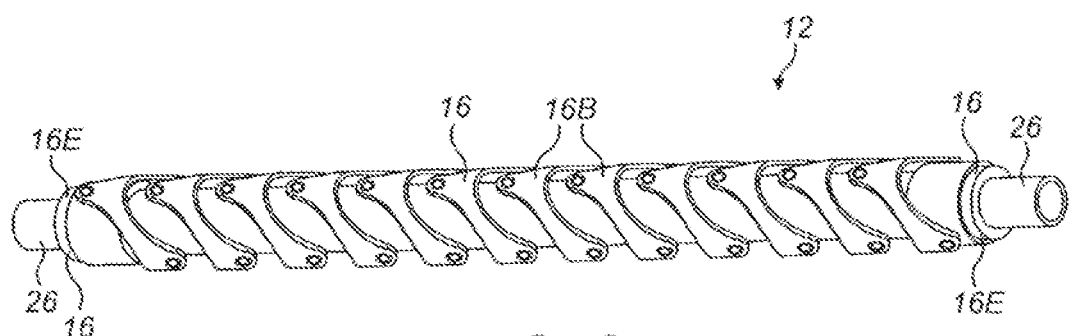
FIG. 2 is a perspective view of an outer articulated spine of the link shown in FIG. 1.
Figure 3:
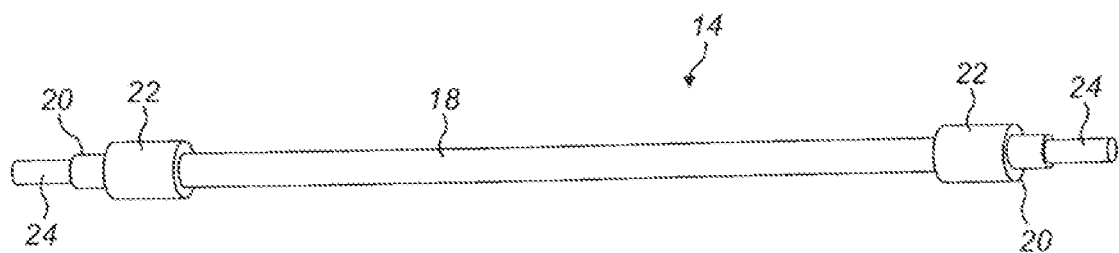
FIG. 3 is a perspective view of a pliant inner conduit of the link shown in FIG. 1, that fits within the spine shown in FIG. 2.

Referring firstly to FIGS. 1 to 3 of the drawings, a pliant articulated link 10 of the invention shown in FIG. 1 comprises an articulated spine 12 shown in FIG. 2 and an elongate pliant inner conduit 14 shown in FIG. 3. FIG. 1 shows a human figure beside the articulated link 10 as a non-limiting indication of its typical scale.

As will be explained below with reference to later drawings, the link 10 is designed to be incorporated into a catenary riser between, and in series with, upper and lower pipe sections of the riser. Thus, the invention can adapt a traditional SCR by the addition of the articulated link 10 at the most efficient and beneficial location along the length of the SCR, to create a gimbal joint riser or 'GJR'. This minimises compression loads and stress spikes experienced in the riser at and around the touch-down point and improves the fatigue endurance of the riser for its service life.

The spine 12 comprises a longitudinal series of interconnected rigid vertebrae, joints or segments 16. The series of segments 16 comprises multiple body segments 16B in a row between two end segments 16E. As will be explained below with reference to FIGS. 4 and 5, the segments 16 are attached to neighbouring segment(s) 16 in the series in a manner that allows limited relative pivotal movement between neighbouring segments 16 in any direction.

The successive segments 16 of the spine 12 together form an interrupted elongate tube that surrounds and defines a central lumen. The inner conduit 14 is received telescopically and concentrically within the lumen of the spine 12 such that the conduit 14 is surrounded and protected by the segments 16, much as human vertebrae surround and protect the spinal cord.

The inner conduit 14 comprises a length of pliant pipe 18 that extends between tubular steel end fittings 20 at opposed ends of the pliant pipe 18.

The pliant pipe 18 may take various forms depending upon the application, examples being: unbonded flexible pipe; bonded flexible pipe; polymer tubing; thermo-composite pipe (TCP) or other composite pipe; and coiled tubing.

Each end fitting 20 of the pliant pipe 18 comprises an enlarged inner anchor portion 22 and a narrower outer end portion 24. When the link 10 is assembled as shown in FIG. 1, the inner anchor portions 22 are engaged within respective end segments 16 of the spine 12 whereas the outer end portions 24 protrude axially from the respective end segments 16.

By virtue of their engagement with the end segments 16, the inner anchor portions 22 of the end fittings 20 couple the pliant pipe 18 mechanically to the spine 12. Specifically, each end segment 16 of the spine 12 comprises a tubular sleeve 26 that surrounds and engages a respective inner anchor portion 22. This engagement allows axial forces, such as compressive shock loads or tension due to the weight of the riser, to be transmitted along the spine 12 rather than through the pliant pipe 18 of the inner conduit 14.

Conversely, the outer end portions 24 of the end fittings 20 protrude axially from the sleeves 26 of the end segments 16 of the spine 12. The outer end portions 24 are adapted to be joined in fluid-tight manner to respective lengths of rigid pipe of a catenary riser into which the link 10 is to be incorporated. For example, where the link 10 is to be incorporated into the riser by welding, tubular outer interface formations of the end portions 24 may have bevelled outer ends.

The end segments 16 of the spine 12 may also be adapted to interface with equipment handling devices onshore or offshore for safe lifting, orientation and insertion into a riser.

In this example, the spine 12 resists relative axial movement between neighbouring segments 16. Thus, longitudinal or axial extension or contraction of the link 10 is not possible, except to the minimal extent that may be permitted by an accumulation of tolerances between the interconnecting parts. In any event, it is preferred that any minor axial extension or contraction of the spine 12 is not such as to transfer substantial additional axial loads to the pliant pipe 18. Thus, whilst the pliant pipe 18 could be under slight axial tension or compression when assembled into the articulated link 10, the spine 12 should carry substantially all of the transient axial loads to which the articulated link 10 will be subjected in use.

The gimbal joint elements or segments 16 in the spine 12 of the link 10 of the invention are responsible for articulating with minimum stiffness and for supporting the tension of the catenary. The internal flexible element or pliant conduit 14 conducts fluid and provides pressure containment while also conferring lower localised bending stiffness on the system. In particular, the pliant conduit 14 has lower bending stiffness than the adjoining steel flowline of the riser.

Figure 4:
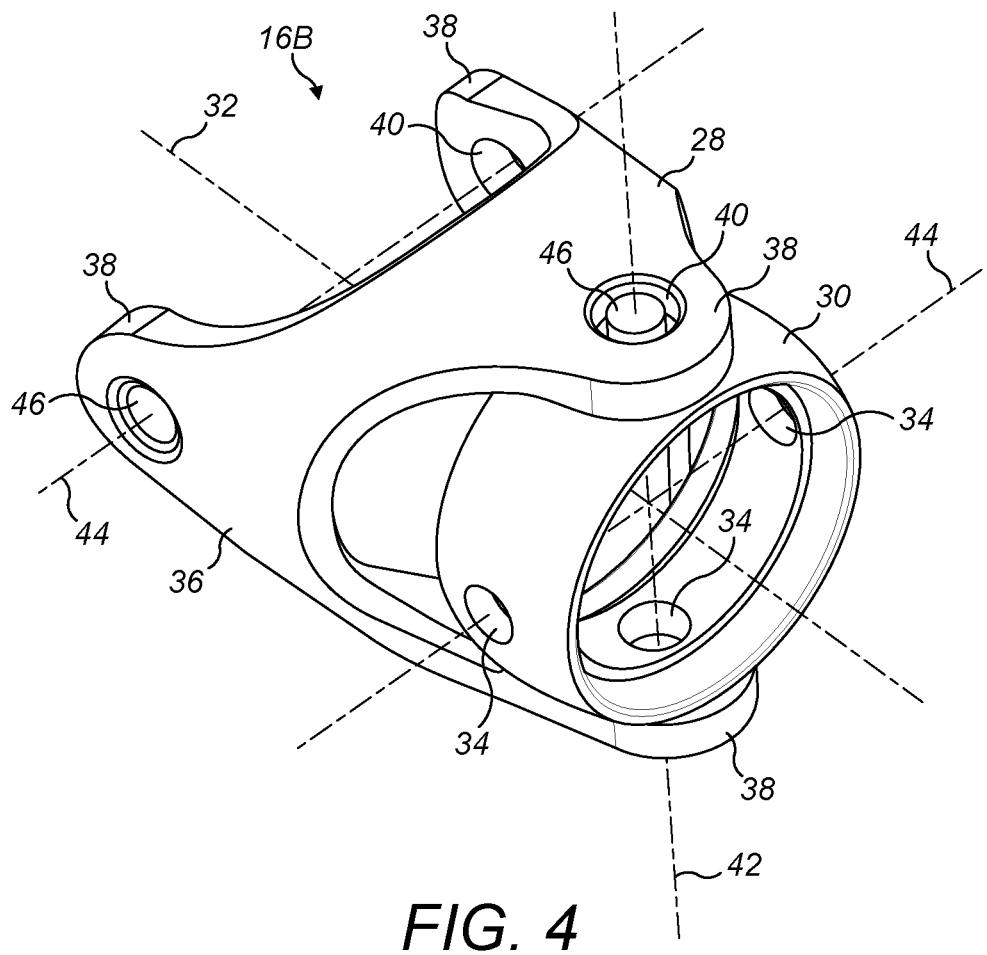
FIG. 4 is a perspective view of a segment of the spine shown in FIG. 2.

Turning next to FIG. 4 of the drawings, this shows one of the body segments 16B of the spine 12 in detail. The body segment 16B comprises a pull head 28 and an inner ring 30. The inner ring 30 is pivotably supported by the pull head 28. Each end segment 16E of the spine 12 also supports an inner ring 30 that is pivotably attached to the adjoining body segment 16B.

The inner ring 30 is centred on a central longitudinal axis 32 that extends through the body segment 16B. The inner ring 30 is penetrated by four radially-extending holes 34 that are equi-angularly spaced in two pairs around the inner ring 30 at 90-degree intervals.

When it is in a central, neutral position relative to the pull head 28, the inner ring 30 lies in a plane that is orthogonal to the central longitudinal axis 32 as shown. This neutral position of the inner ring 30 corresponds to the spine 12 being straight.

The pull head 28 comprises an annular body 36 that is of substantially circular cross-section, also centred on the central longitudinal axis 32. The pull head 28 further comprises two fork formations, each comprising a pair of smoothly-radiused, diametrically-opposed projections 38 that are integral with the body 36. The fork formations extend in mutually-opposed axial directions from respective ends of the body 36.

The fork formations are offset angularly from each other by a quarter turn about the central longitudinal axis 32. In other words, one pair of projections 38 at one end of the body 36 is turned through 90° about the central longitudinal axis 32 with respect to the other pair of projections 38 at the other end of the body 36.

The projections 38 of each pair are penetrated by respective holes 40 that are in mutual alignment. The holes 40 of a first pair are aligned along a first pivot axis 42. The holes 40 of a second pair are aligned along a second pivot axis 44 that is orthogonal to, and spaced longitudinally from, the first pivot axis 42.

The inner ring 30 is pivotably connected to the pull head 28 by diametrically-opposed pivot pins 46 that are received by aligned holes 34, 40 in the inner ring 30 and in the first pair of projections 38 of the pull head 28. One pivot pin 46 is shown here in one of the first pair of projections 38; the pivot pin 46 in the opposite aligned holes 34, 40 has been omitted.

This leaves two other holes 34 in the inner ring 30 that are similarly connected to the pull head 28 of a neighbouring body segment 16B via the holes 40 of its second pair of projections 38. Again, one pivot pin 46 is shown here in one of the second pair of projections 38; the pivot pin 46 in the opposite hole 40 has been omitted.

Figure 5:
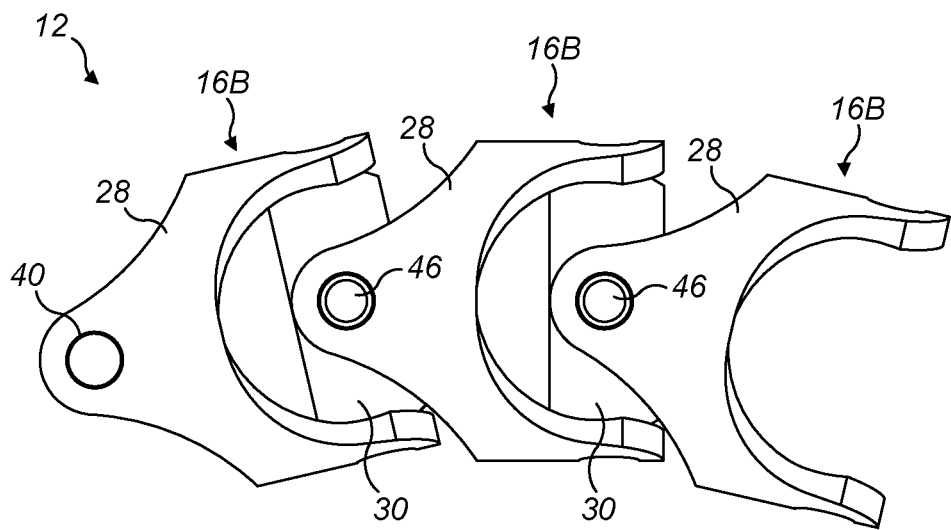
FIG. 5 is a side view of three interconnected segments shown in FIG. 4, deflected angularly relative to each other to illustrate how the spine shown in FIG. 2 can bend along the length.

Thus, with reference now also to FIG. 5, when the spine 12 comprising a longitudinal series of such body segments 16B has been assembled, the pull head 28 is pivotably connected by pivot pins 46 to the inner ring 30 of the preceding body segment 16B of the series. Similarly, the inner ring 30 is pivotably connected by pivot pins 46 to the pull head 28 of the next body segment 16B of the series. Thus, each pull head 28 is connected to two inner rings 30 and each inner ring 30 is connected to two pull heads 28.

Two-axis angular deflection of segments 16 relative to their neighbours allows the spine 12, and hence the articulated link 10 also comprising the pliant inner conduit 14, to bend away from a straight longitudinal axis 32 along a curved path in any direction. In this respect, each projection 38 occupies substantially less than 90° of arc in a plane containing the respective pivot axis 42, 44. This ensures clearance for relative angular movement between the segments 16 as the spine 12 bends.

The extent to which the spine 12 can bend is limited because parts of neighbouring segments 16 will eventually abut and bear against each other as shown in FIG. 5. This prevents further angular deflection of the spine 12. In this way, the spine 12 protects the pliant pipe 18 of the inner conduit 14 by ensuring that the MBR of the pliant pipe 18 cannot be exceeded. In this example, the minimum angle between successive segments 16 is 167.08°, corresponding to an angular deflection from one segment 16 to the next of 12.92°.

Turning next to FIGS. 6a to 6d, these schematic and much-simplified drawings show a reel-lay vessel 48 floating on the surface 50 of the sea when visiting a coastal spoolbase 52. The vessel 48 is shown here spooling a rigid pipeline onto a reel 54, subsequently to carry the pipeline offshore for laying as a catenary riser.

Other reel-lay equipment of the vessel 48 such as a pipe straightener and a lay ramp has been omitted from these drawings for clarity. A vertical-axis reel, also known as a carousel, could be used instead of the horizontal-axis reel 54 shown here.

The spoolbase 52 comprises a pipeline factory 56 at which pipe joints are assembled end-to-end into pipe stalks and the pipe stalks are assembled end-to-end into pipeline sections. The pipeline sections may be several hundred metres long.

Figure 6A:
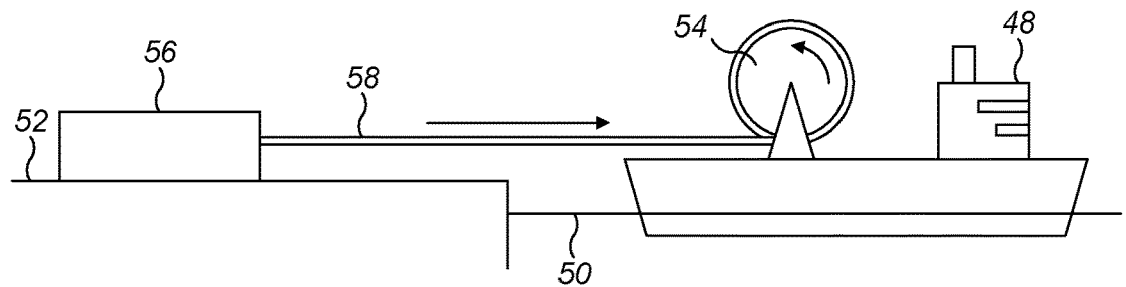
FIGS. 6a to 6d are a sequence of schematic side views of an articulated link being incorporated into a catenary riser during onshore fabrication and spooling onto a reel of a reel-lay vessel in preparation for installing the riser.

FIG. 6a shows a first pipeline section 58 emerging from the pipeline factory 56 and being spooled onto the reel 54 as the reel 54 turns.

Figure 6B:
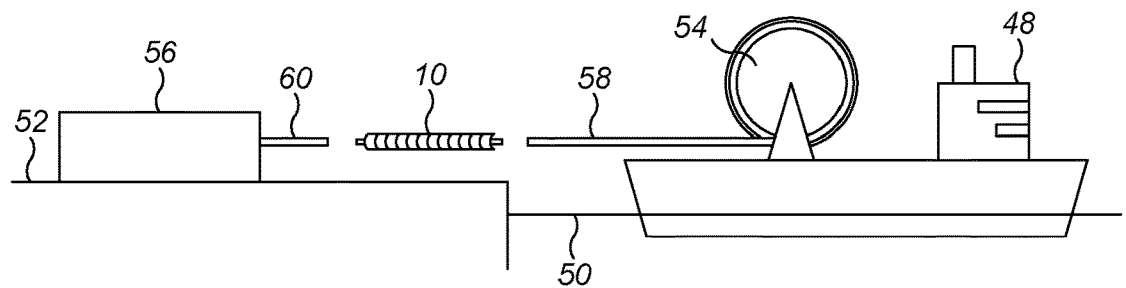

FIG. 6b shows the reel 54 now stationary as only a trailing end portion of the first pipeline section 58 remains to be spooled onto the reel 54. A leading end portion of a second pipeline section 60 is shown ready to be pulled from the pipeline factory 56. A link 10 in accordance with the invention is shown interposed in a gap between the pipeline sections 58, 60.

Figure 6C:
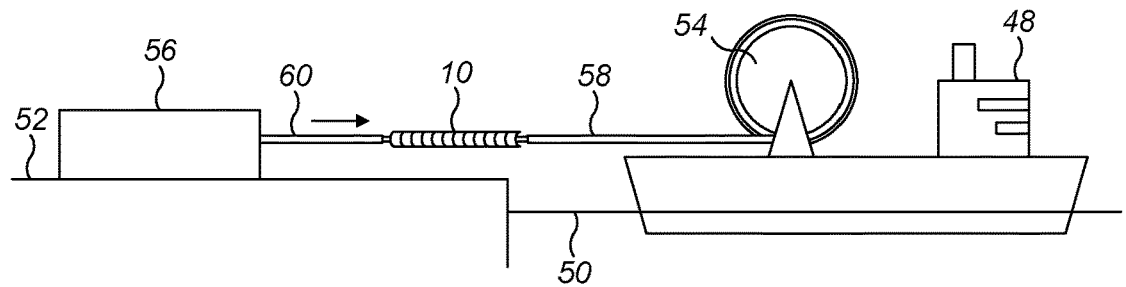

FIG. 6c shows the link 10 now joined to the trailing end of the first pipeline section 58 and to a leading end of the second pipeline section 60. Typically, joining will be effected by forming circumferential butt welds between the pipeline ends and bevelled interface formations of the end portions 24 of the link 10.

Figure 6D:
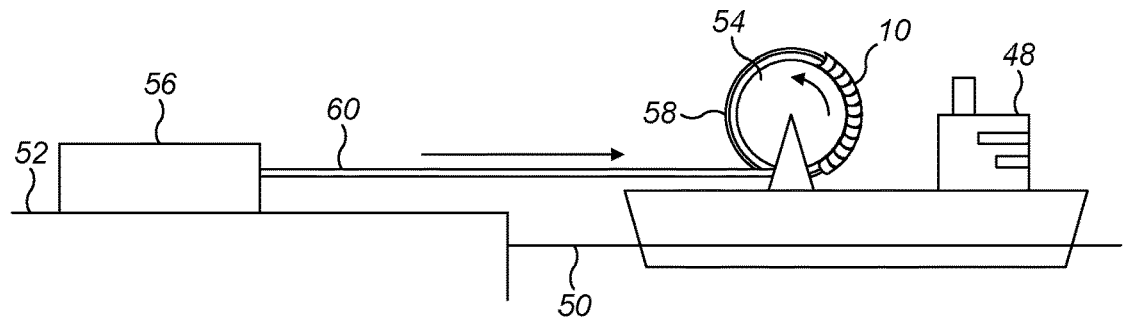

FIG. 6d shows the reel 54 now turning again as the link 10 has been pulled onto the reel 54 between the pipeline sections 58, 60 that it joins. The ability of the spine 12 to flex along its length enables the link 10 to be spooled onto the reel 54, while the spine 12 protects the pliant pipe 18 of the inner conduit 14 against damage or exceeding its MBR during spooling.

When spooling of the second pipeline section 60 has been completed, the vessel 48 can depart for an installation site at which the riser will be laid using well-known reel-lay techniques. During installation, the second section 60 will be unspooled and overboarded first, as a lower section of the riser to lie on the seabed. The second section 60 is followed by the link 10 and finally by the first section 58. The first section 58 will then serve as an upper section of the riser extending from the link 10 to a supporting floating surface vessel or installation, such as an FPSO or a platform.

As will be explained later with reference to FIGS. 9 and 10 of the drawings, the link 10 is suspended above the seabed as part of the free span of the riser that extends between the seabed and the surface. This decouples motion of the supporting FPSO or platform from the touch-down point where the riser meets the seabed. Thus, the link 10 is at a level above the seabed and hence at a level above the touch-down point. Preferably, the link 10 is at the sag bend of the riser, which is typically a few tens of metres above the seabed.

FIGS. 7a to 7d show that the link 10 need not be joined to both of the pipeline sections 58, 60 at a coastal location such as a spoolbase. Instead, the link 10 could be joined to one or both of the pipeline sections 58, 60 aboard a reel-lay vessel 48 offshore. The link 10 may previously have been joined to one of the pipeline sections 58, 60 or to neither of the pipeline sections 58, 60.

Like numerals are used for like features in FIGS. 7a to 7d, which now shows basic reel-lay equipment on the vessel 48. That equipment comprises: a pipe straightener 62 for straightening the pipeline sections 58, 60 as they are unspooled from the reel 54; a lay ramp 64 whose inclination matches that of a launch axis for the pipeline sections 58, 60; and a tensioning system 66 for applying hold-back tension to the length of the pipeline sections 58, 60 suspended from the vessel 48. The tensioning system 66 may comprise a combination of clamps and/or tensioners acting on the pipeline sections 58, 60, as will be well understood by those skilled in the art.

Figure 7A:
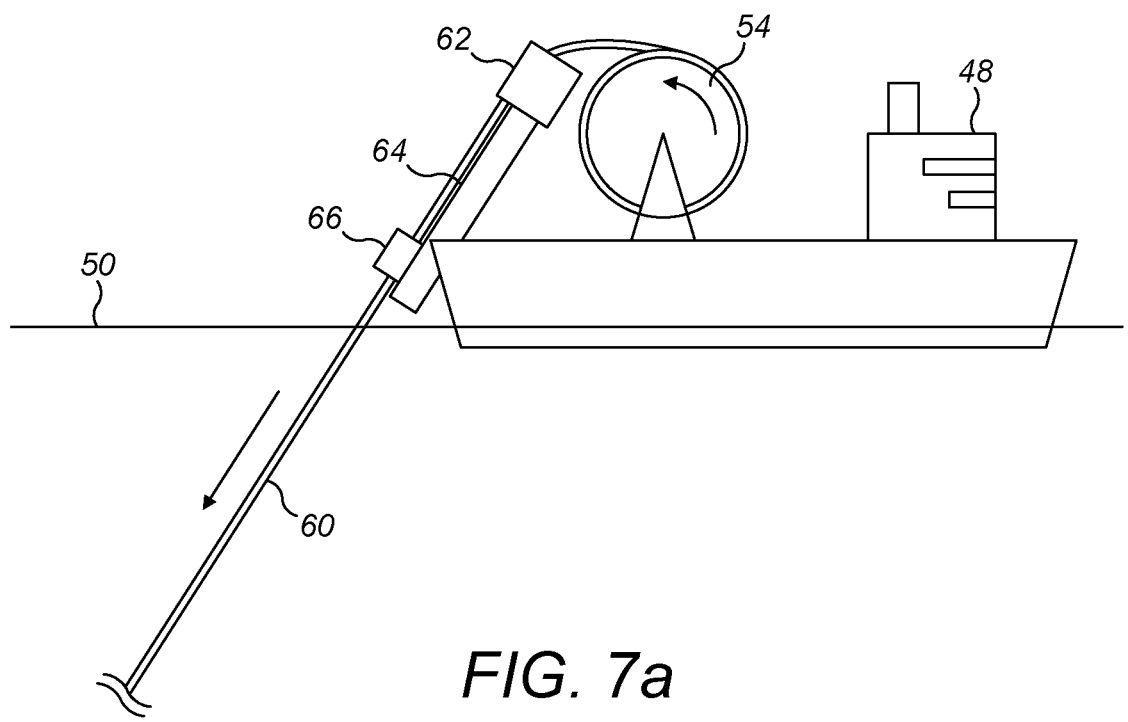
FIGS. 7a to 7d are a sequence of schematic side views of an articulated link being incorporated into a catenary riser offshore aboard a reel-lay vessel, shown here in the process of installing the riser.

FIG. 7a shows a lower pipeline section 60 of the riser being unspooled, straightened and overboarded first after passing along the lay ramp 64 and through the tensioning system 66.

Figure 7B:
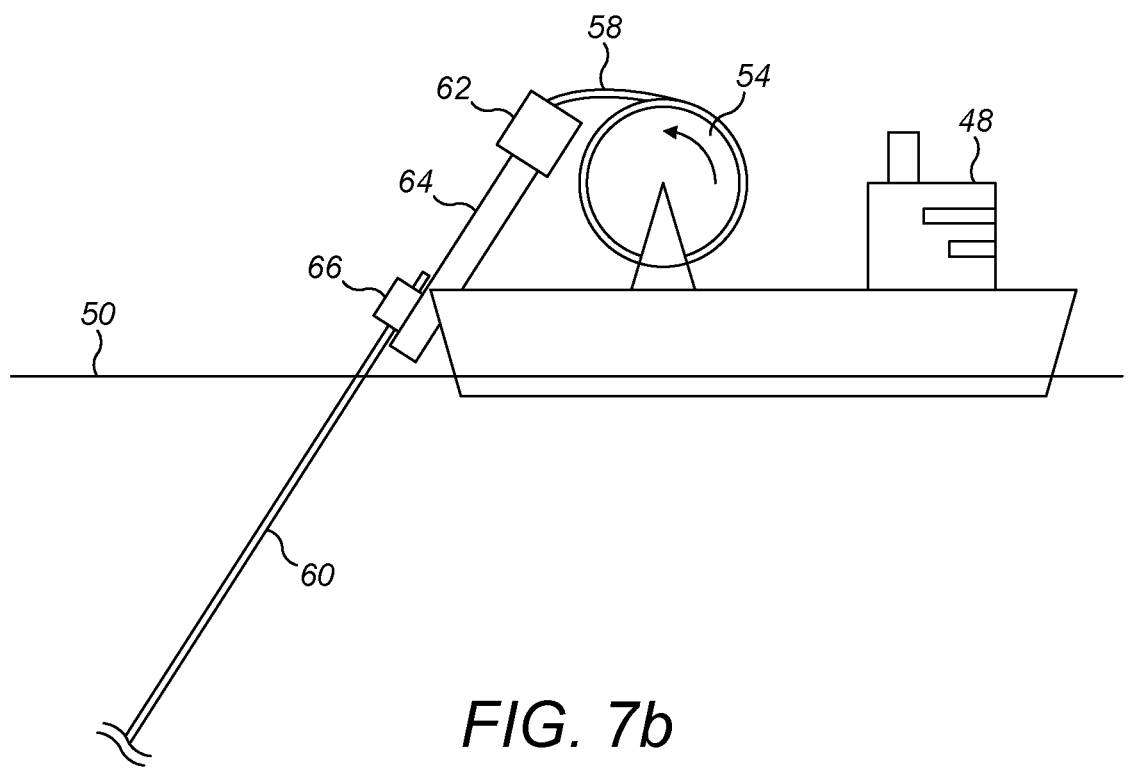

FIG. 7b shows the lower pipeline section 60 of the riser now fully unspooled and almost entirely overboarded. An upper end of the lower pipeline section 60 is supported by the tensioning system 66. The upper pipeline section 58 of the riser is also shown being unspooled from the reel 54 and fed into the pipe straightener 62. Optionally, however, the upper pipeline section 58 could be unspooled from a different reel.

Figure 7C:
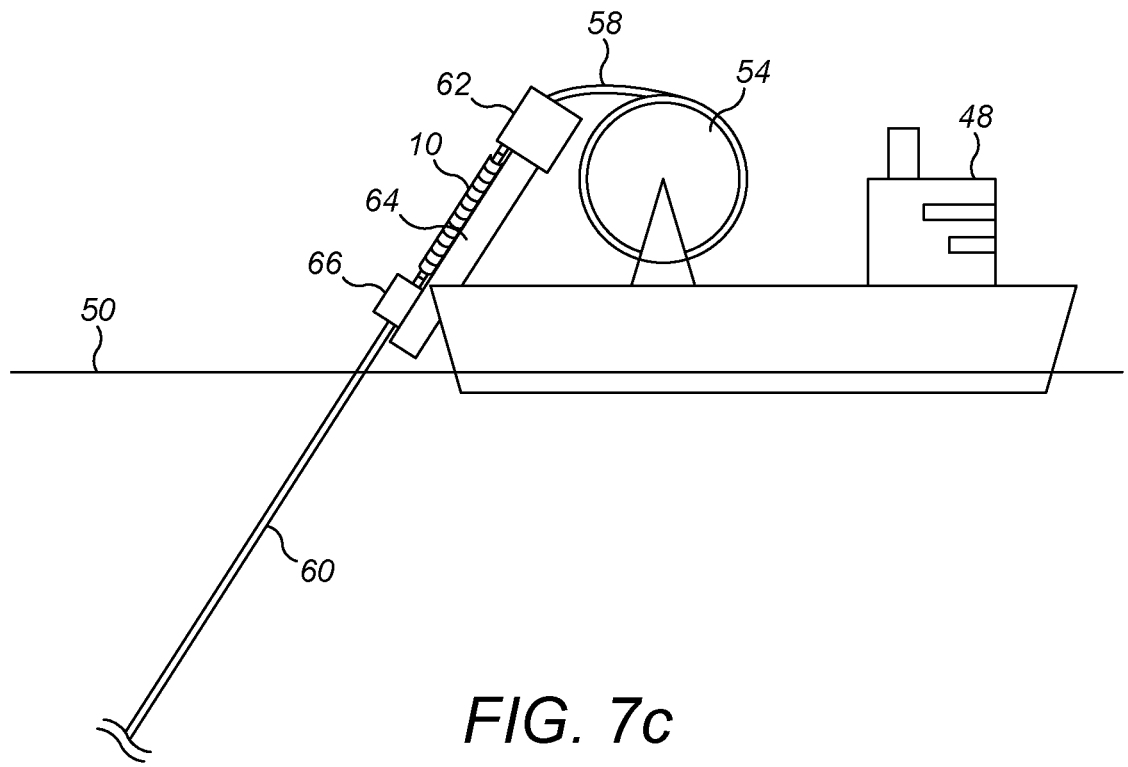

In FIG. 7c, the link 10 has been lifted onto the lay ramp 64 and joined to the facing ends of the upper and lower pipeline sections 58, 60. The techniques used to lift and join the link 10 are routinely used for inserting in-line accessories into a reel-laid pipeline. Being well understood by those skilled in the art, those techniques need no elaboration here.

Figure 7D:
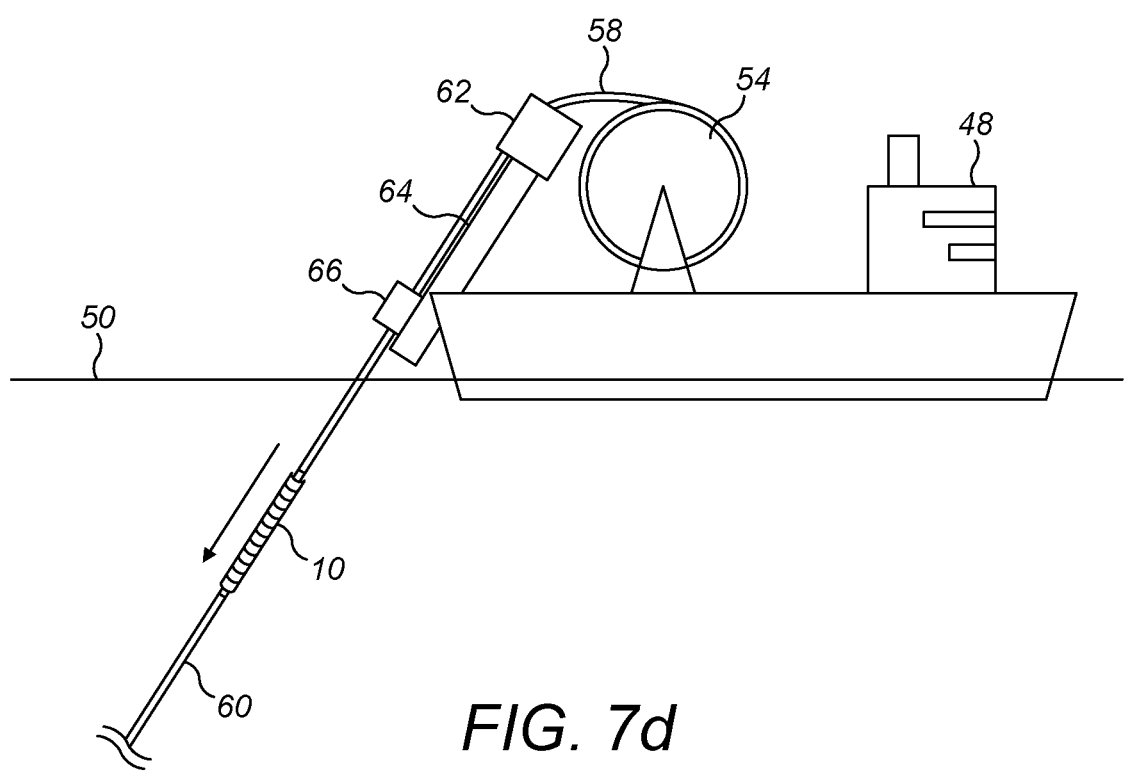

FIG. 7d shows the lower pipeline section 60 of the riser and the articulated link 10 now launched fully beneath the surface 50 of the sea as unspooling and straightening of the upper pipeline section 58 continues. The tensioning system 66 has released the pipeline sections 58, 60 to allow the link 10 to pass along the launch axis.

When the riser has been installed fully, a major portion of the lower pipeline section 60 will lie on the seabed. A minor portion of the lower pipeline section 60 adjoining the link 10 will be suspended above the seabed where it extends beyond the touch-down point. The upper pipeline section 58 will extend through the water column from the link 10 to a supporting floating surface vessel or installation, such as an FPSO or a platform.

Moving on now to FIGS. 8a to 8d, these drawings show how the link 10 may be incorporated into a pipe string 68 as the pipe string 68 is being fabricated aboard a pipelaying vessel 70 offshore. In this example, the pipelaying vessel 70 is configured for S-lay operations although it will be clear to those skilled in the art that the same principle can also be applied to J-lay operations.

Again, the pipelaying vessel 70 shown schematically in these drawings is not to scale and is much-simplified. In particular, the pipelaying vessel 70 has only basic equipment on its working deck, comprising a welding station 72 and a tensioning system 74 downstream of the welding station 72. Downstream of the tensioning system 74, the pipeline 68 is launched over a stinger 76, curving through an overbend, to hang in the water beneath the stinger 76 as a catenary.

In practice, there will be a succession of welding stations 72, testing stations and coating stations on the working deck upstream of the tensioning system 74. The tensioning system 74 will typically comprise multiple tensioners.

Figure 8A:
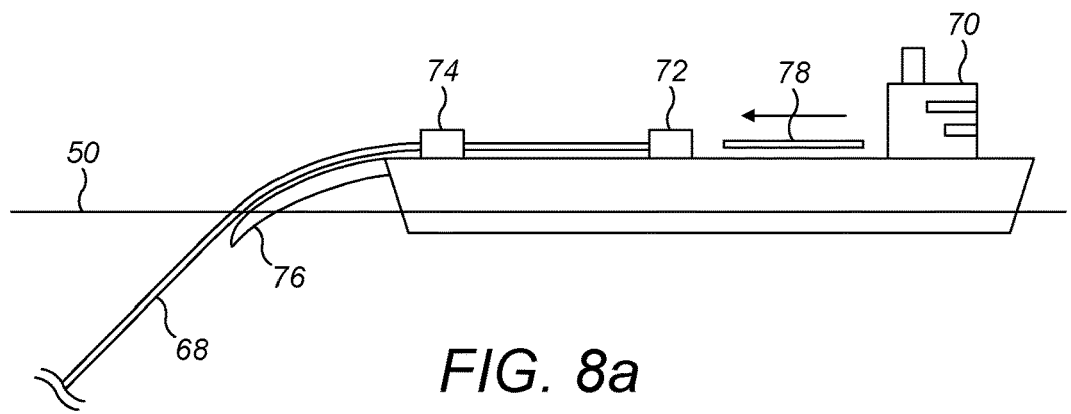
FIGS. 8a to 8d are a sequence of schematic side views of an articulated link being incorporated into a catenary riser offshore aboard an S-lay vessel, shown here in the process of fabricating and installing the riser.

At the welding station 72, standard-length pipe joints 78 as shown in FIG. 8a are welded to an upper end of an already-fabricated pipe string 68, to which the tensioning system 74 applies hold-back tension that supports the weight of the suspended catenary.

Figure 8B:
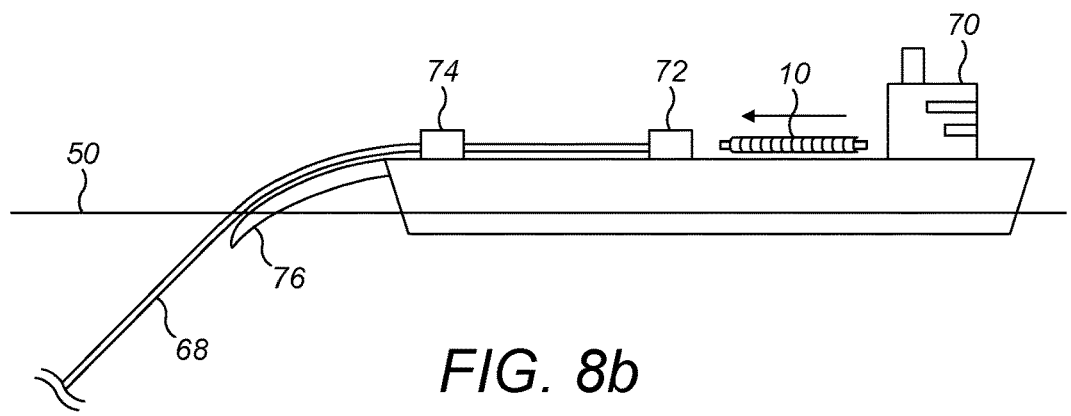

FIG. 8b shows a link 10 being inserted into the pipe string 68 in place of a pipe joint 78. Conveniently, the link 10 may be of a similar length to, or at least no longer than, a pipe joint 78 or a multiple thereof so as not to disrupt the stepwise fabrication and processing steps that are performed aboard the vessel 70. Again, the techniques used to join the link 10 to the pipe string 68 are routinely used for inserting in-line accessories such as in-line tees (ILTs) into a pipeline during S-lay or J-lay operations. Being well understood by those skilled in the art, those techniques need no elaboration here.

Figure 8C:
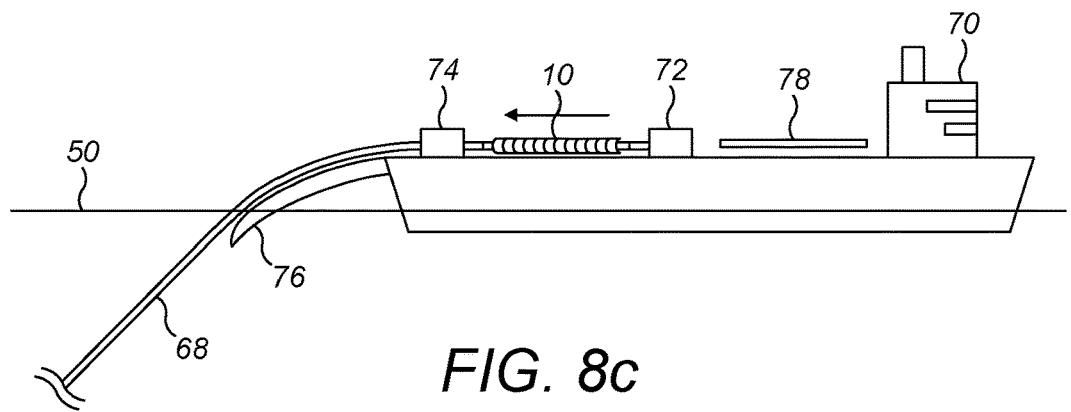

FIG. 8c now shows the link 10 having been welded at both ends to pipe joints 78 of the pipe string 68 and advancing past the welding station 72 toward the tensioning system 74. Another pipe joint 78 is shown being readied for welding to the upper end of the growing pipe string 68 that now incorporates the link 10.

Figure 8D:
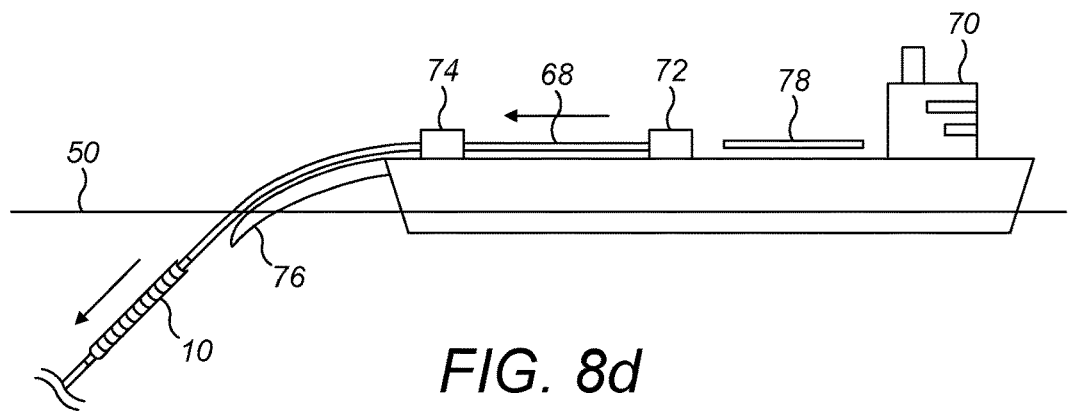

As further pipe joints 78 are welded to the upper end of the pipe string 68, the link 10 advances through the tensioner system 74 and over the stinger 76 to be launched beneath the surface 50 of the sea as shown in FIG. 8*d*. Advantageously, the elongate, narrow dimensions of the link 10 facilitate its passage through the tensioning system 74 and along the stinger 76. Its flexibility also allows the link 10 to follow the overbend curvature as the pipe string 68 advances along and beyond the stinger 76, while protecting the pliant conduit 14 within the articulated spine 12.

The pipe string 68 comprises a portion downstream of the link 10 and a portion upstream of the link 10, having regard to the launch direction. The downstream portion of the pipe string 68 constitutes the lower section of the riser, a major portion of which will lie on the seabed when the riser has been installed fully. Again, a minor portion of the lower section adjoining the link 10 will be suspended above the seabed where it extends beyond the touch-down point. The upstream portion of the pipe string 68 constitutes the upper section of the riser, which again extends through the water column from the link 10 to a supporting surface vessel or other floating installation, such as an FPSO or a platform.

As noted above, FIGS. 9 and 10 show the link 10 in a static configuration, suspended above the seabed as part of the free span of a rigid steel catenary riser 80 that hangs from a supporting FPSO 82 at the surface 50 and extends from there to the seabed 84. The link 10 is shown here at the sag bend of the riser 80, a few tens of metres above the seabed 84, and hence at a level above the touch-down point 86 where the riser 80 meets the seabed 84.

Figure 9:
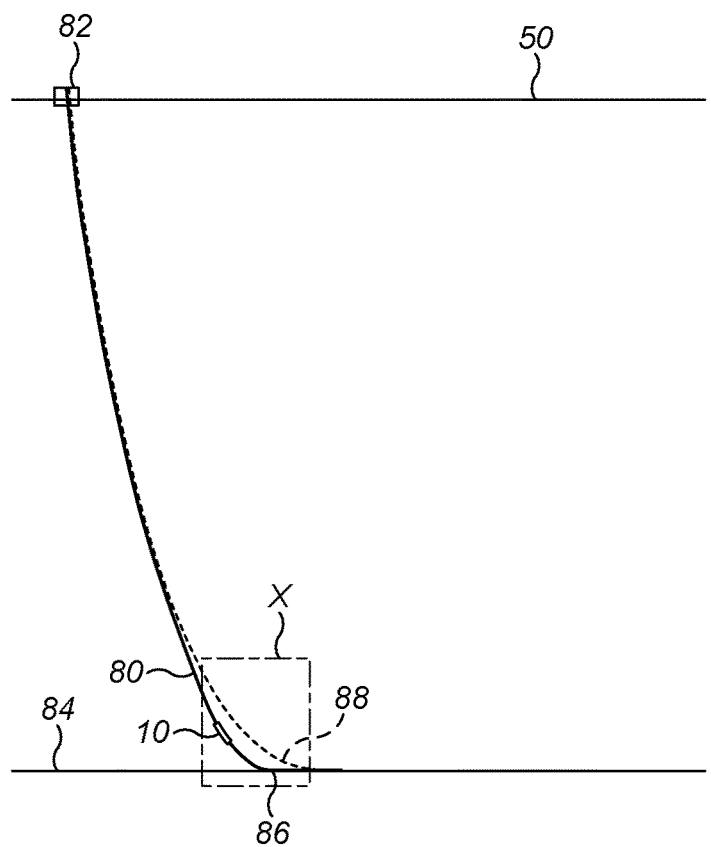
FIG. 9 is a schematic side view that compares the catenary shape of a conventional SCR with the catenary shape of an equivalent riser incorporating the articulated link of the invention.
Figure 10:
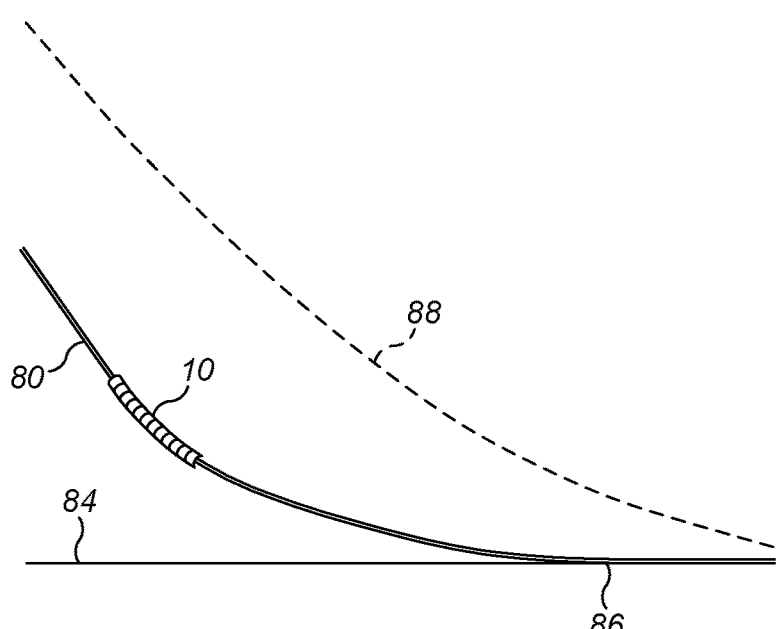
FIG. 10 is an enlarged schematic side view corresponding to Detail X of FIG. 9.

By way of comparison, FIGS. 9 and 10 also show the curvature of a corresponding conventional SCR 88 in dashed lines. It will be apparent that the weight of the link 10 changes the shape of the riser 80 in the sag bend region, making the sag bend curvature more acute than in a conventional SCR 86. Like a known weight-distributed riser, the weight of the link 10 contributes significantly to the dynamic behaviour of the riser 80. However, the articulation of the spine 12 accommodates the concentrated weight of the link 10 to avoid over-stressing the riser 80 around the mass concentration point.

Figure 11:
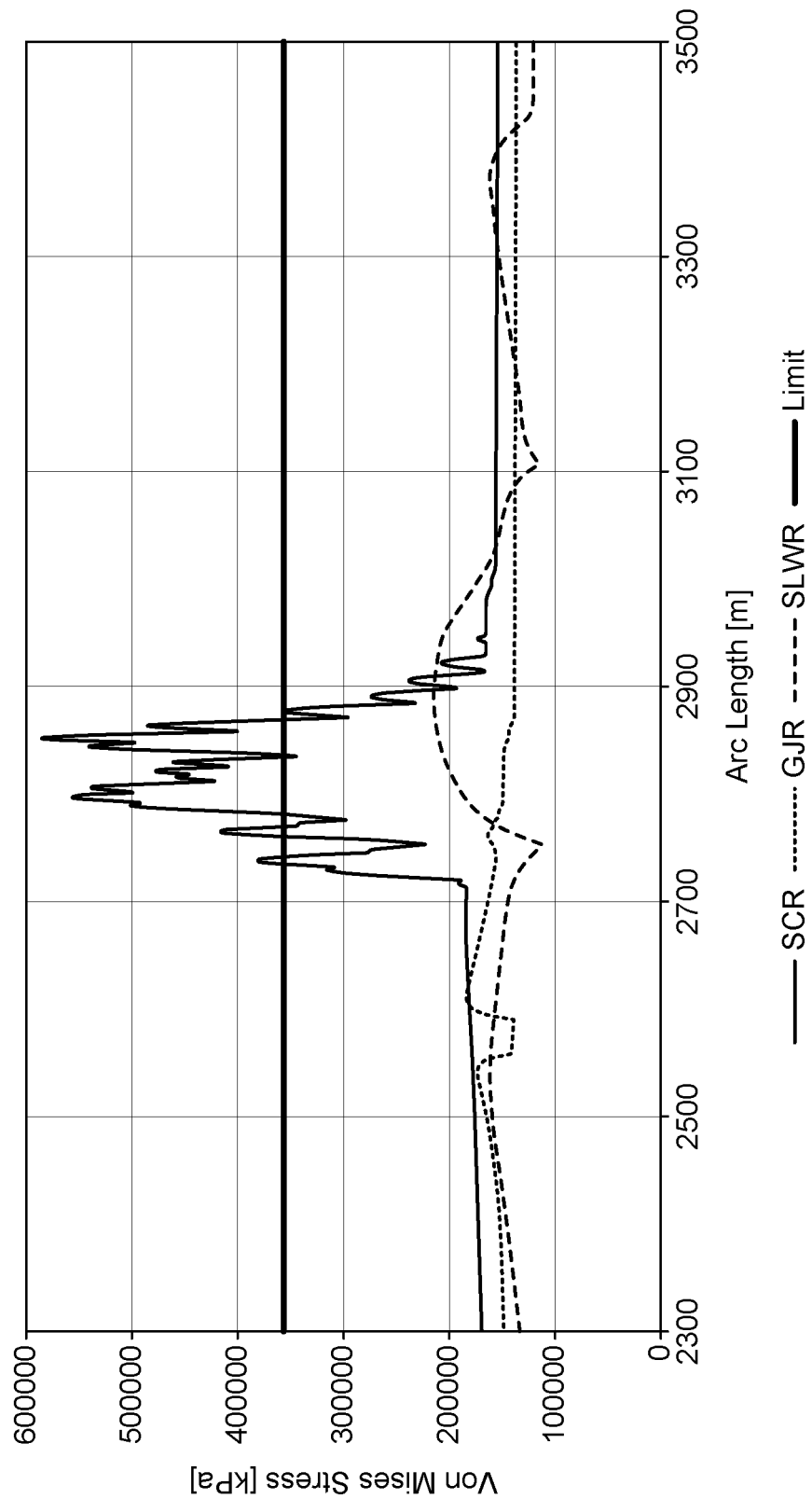
FIG. 11 is a graph comparing levels of von Mises stress for conventional risers against a riser that incorporates an articulated link in accordance with the invention.

Turning finally to FIG. 11, the graph shown here plots von Mises stress against the arc length of a riser for various types of equivalent risers in a simulated dynamic marine environment. A limiting von Mises stress level of approximately 360000 kPa is shown as a horizontal line.

It will be apparent that in the case of a conventional SCR, the limiting stress is exceeded at an arc length of between 2700 and 2900 metres, which corresponds to the sag bend region approaching the touch-down point in this example.

Before the present invention, the standard approach when designing a riser system for use in this dynamic environment would be to opt for a more complex system than a conventional SCR, such as a steel lazy-wave riser (SLWR), to keep the von Mises stress below the limiting level as shown. However, such a solution is significantly more expensive than a conventional SCR.

The invention, modelled here as a gimbal joint riser or GJR, keeps the von Mises stress well below the limiting level, to a similar or better extent than the SLWR, yet at very much lower cost than an SLWR.

The invention claimed is:

1. A pliant link for a subsea riser, the link comprising:
   an articulated spine having a longitudinal series of interconnected rigid segments that is capable of being coupled to upper and lower sections of the riser to transmit loads along the riser through the link on a load path that extends through the segments,
   wherein segments of the spine are connected to adjoining segments of the spine by pivot pins that are received in aligned openings of the adjoining segments for relative pivotal movement between the adjoining segments; and
   a pliant pipe that is no longer than the spine, the pliant pipe terminating in end fittings that are capable of being joined, respectively, to the upper and lower sections of the riser for fluid communication along the riser through the link, wherein the end fittings are engaged rigidly with respective ends of the spine, such that the load path extends at least partially through the end fittings, and the pliant pipe is substantially decoupled from the load path.

2. The link of claim 1, wherein the segments surround the pliant pipe.

3. The link of claim 1, wherein interface formations of the end fittings are adapted for mechanical and fluid coupling with the upper and lower sections of the riser.

4. The link of claim 3, wherein the interface formations comprise bevelled ends.

5. The link of claim 1, wherein anchor formations of the end fittings engage within sleeves at the ends of the spine.

6. The link of claim 1, wherein the spine is arranged to transmit compressive, tensile and torsional loads along the riser through the link.

7. The link of claim 1, wherein each segment of the spine comprises first and second parts that are connected to each other for relative pivotal movement.

8. The link of claim 7, wherein a first part of an intermediate segment is pivotably coupled to a second part of one of the adjoining segments and a second part of the intermediate segment is pivotably coupled to a first part of another one of the adjoining segments.

9. The link of claim 8, wherein the first part is a ring and the second part is a pull head, the pull head comprising a body and first projections extending longitudinally from the body to support the ring for coupling the ring to a pull head of one of the adjoining segments.

10. The link of claim 9, wherein the pull head further comprises second projections extending from the body in a longitudinal direction opposed to the first projections for coupling the pull head to the ring of the adjoining segments.

11. The link of claim 10, wherein the second projections are offset angularly from the first projections about a longitudinal axis extending through the body.

12. The link of claim 1 wherein relative pivotal movement between adjoining segments is possible about two mutually orthogonal axes.

13. The link of claim 1, wherein relative pivotal movement between adjoining segments is limited to prevent the spine bending beyond a minimum bend radius of the pliant pipe.

14. The link of claim 1, wherein the spine is substantially fixed in length.

15. The link of claim 1, wherein the end fittings extend beyond the length of the spine.

16. The link of claim 1, wherein the pliant pipe is selected from: unbonded flexible pipe; bonded flexible pipe; polymer tubing; composite pipe; and coiled tubing.

17. The link of claim 1, wherein the pliant pipe is free for movement relative to the segments of the spine.

18. The link of claim 1, wherein the segments of the spine are structurally distinct from each other.

19. A subsea riser comprising the link of claim 1 situated between upper and lower sections of the riser.

20. The riser of claim 19, wherein the upper and lower sections are of rigid pipe.

21. The riser of claim 19, wherein the link is situated between the surface and the seabed.

22. The riser of claim 21, wherein the link is situated at a sag bend of the riser.

23. The riser of claim 19, wherein the pliant pipe has lower bending stiffness than the upper and lower sections of the riser.

24. A subsea installation comprising the riser of claim 19.

25. The installation of claim 24, wherein the riser hangs as a catenary from a buoyant support at an upper end of the riser.

26. The installation of claim 25, wherein the support floats at the surface.

* * * * *